United States Patent [19]

Leland

[11] 4,384,362
[45] May 17, 1983

[54] RADIO COMMUNICATION SYSTEM USING INFORMATION DERIVATION ALGORITHM COLORING FOR SUPPRESSING COCHANNEL INTERFERENCE

[75] Inventor: Kenneth W. Leland, Howell, N.J.

[73] Assignee: Bell Telephone Laboratories, Incorporated, Murray Hill, N.J.

[21] Appl. No.: 169,966

[22] Filed: Jul. 18, 1980

[51] Int. Cl.³ .............................................. H04B 3/60
[52] U.S. Cl. ....................................... 455/33; 455/54; 179/2 EB
[58] Field of Search ........................ 455/31, 32, 33, 89, 455/49, 53, 54, 56, 58, 39, 46, 47, 50, 52, 63, 65; 179/2 E, 2 EA, 2 EB, 2 EC, 41 A

[56] References Cited

U.S. PATENT DOCUMENTS

| 3,310,741 | 3/1967 | Uitermark | 455/33 |
| 3,582,787 | 6/1971 | Muller | 455/33 |
| 4,025,853 | 5/1977 | Addeo | 455/33 |
| 4,144,411 | 3/1979 | Frenkiel | 455/33 |

OTHER PUBLICATIONS

AGC, AFC, Tone Select Circuits for Narrow-Band Mobile Radio, by Lusignan, International Telecommunications Exposition (Intelcom. 1979), pp. 1-4, 2/1979.
Spectrum Efficiency of Single Side-Band Radio with Amplitude Compandors, by Lusignan, 29th IEEE Vehicular Technology Conference, Mar. 1979, pp. 1-6.
The Potential of SSB for Land Mobile Radio, by Gibson et al., 29th IEEE Vehicular Technology Conference, Mar. 1979, pp. 90-94.
Control Architecture, By Fluhr et al., Bell System Technical Journal, Jan. 1979, pp. 43, 47-50.

*Primary Examiner*—Tommy P. Chin
*Attorney, Agent, or Firm*—C. S. Phelan

[57] ABSTRACT

In a cellular mobile radiotelephone system in which the service regions of a channel reuse cluster of $N_C$ cells are characterized by a channel reuse distance $D_C$, the regions are assigned transceiver algorithm implementations according to an implementation reuse cell cluster size of $N_A$ cells which are characterized by a reuse distance $D_A$, the combined reuse distance $D_{CO}$ for reuse of a given combination of channel set and implementation is greater than the distance $D_C$. Additional illustrative implementation arrangements are shown.

24 Claims, 6 Drawing Figures

RADIO COMMUNICATION SYSTEM USING INFORMATION DERIVATION ALGORITHM COLORING FOR SUPPRESSING COCHANNEL INTERFERENCE

BACKGROUND OF THE INVENTION

This invention relates to a mobile radiotelephone communication system in which communication channels are reused in different parts of an overall mobile service area. The invention relates, in particular, to a technique for suppressing cochannel interference sufficiently to improve perceived voice signal quality in received signals.

In cellular channel reuse mobile radiotelephone systems, such as that described in the entire January, 1979, issue of the *Bell System Technical Journal* (BSTJ), it is known that frequency channels can be reused in different parts of a service area if the parts are sufficiently spaced to prevent intolerable cochannel interference between adjacent reuse locations. This reuse distance D, is determined in the form of a compromise between the size of cells which are employed in the system and the number of channel sets of a given block of radio channels, as well as the maximum number of channel sets required to handle maximum cell traffic volume in any given cell. Prior cellular systems that have been implemented using frequency modulation (FM) techniques, as in the aforementioned BSTJ, at least in part, because FM is usually less demanding than in amplitude modulation (AM) in the realms of frequency stability, circuit linearity, and insensitivity to fading. This situation prevailed even though channel bandwidth required for AM single sideband (SSB) is usually substantially less than is required for FM. Advances in the state of the art have mitigated somewhat the linearity aspect. Similarly, the fading and stability problems have been reduced by proposals such as those in the copending U.S.A. patent applications entitled "Single Sideband Receiver With Pilot-Based Feed Forward Correction For Motion-Induced Distortion," U.S. Pat. No. 4,313,211, for K. W. Leland, and "Frequency Stabilization Circuit For a Local Oscillator," Ser. No. 06/097,422, filed Nov. 26, 1979, for K. W. Leland and N. R. Sollenberger. Both such applications are assigned to the same assignee as the present application. Relief in these areas has made cochannel interference a more significant concern, and the present invention is directed to a technique for improving perceived voice signal quality in the presence of cochannel interference.

Attempts have been made in the prior art to resolve the dilemma, given a fixed number of available channels, of needing, on one hand, a relatively few channel sets per cell reuse pattern so that there will be a sufficiently large number of channels in each cell for good traffic handling capability and needing, on the other hand, many channel sets per cell reuse pattern in order to realize a relatively large reuse pattern which affords substantial geographical separation between cochannel antenna sites. An R. H. Frenkiel U.S. Pat. No. 4,144,411 shows one example of an FM cellular system utilizing cochannel site spacing for suppressing cochannel interference. Otherwise, prior art techniques have usually involved the employment of marker tones to facilitate the task of distinguishing among transmissions received at a single point from a plurality of closest cochannel stations. Such a marker tone use is sometimes called "coloring," e.g., as in color coding wires of a cable. In these systems, if an incorrect marker tone, sometimes called a supervisory audible tone (SAT), is detected, the station receiver is quieted; and a call in progress is terminated if the incorrect marker tone persists beyond a predetermined interval.

An E. J. Addeo U.S. Pat. No. 4,025,853 illustrates one technique for utilizing the SAT signal in an FM cellular system for suppressing cochannel interference. In a paper entitled "AGC, AFC Tone Select Circuits for Narrow Band Mobile Radio" by B. B. Lusignan, presented at the International Telecommunications Exposition (Intelcom, 1979), Dallas, Tex., February, 1979 (copies hand distributed), and in another paper by the same author entitled "Spectrum Efficiency of Single Side-band Radio with Amplitude Compandors," presented in the March, 1979, IEEE Vehicular Technology Group Conference in Arlington Heights, Ill. (copies hand-distributed), a system is disclosed in which a marker tone is modulated onto a pilot signal adjacent to the voice band in a channel of an AM SSB system; and if the wrong tone is detected in the absence of voice transmissions in a received signal, the station receiver is squelched to relieve the listener of the need to listen to messages from others utilizing the same channel at different stations.

In yet another SSB system described by R. W. Gibson and R. Wells in "The Potential of SSB for Land Mobile Radio," *IEEE Vehicular Technology Conference Record*, Mar. 27-30, 1979, pages 90-94, companding is used to reduce the relative effect of cochannel interference during pauses in speech in a desired channel. However, such an arrangement has no significant effect in terms of improving desired channel voice quality during speech times.

SUMMARY OF THE INVENTION

The foregoing problems of the prior art are reduced in a single sideband cellular system in which transceivers are arranged to operate on selectable channels and selectable implementations of a predetermined transceiver algorithm. Cell antenna sites serving regions of a first group of cells are equipped to operate on predetermined different channel sets of a given block of channels, the channel sets being distributed among the sites in accordance with a first predetermined pattern. Similarly, the cell antenna sites serving regions of a second group of cells are equipped to operate on the same channel sets arranged in the same pattern, but using at least one predetermined different implementation of the transceiving algorithm. The mobile station transceivers in different cells of the system include data-message-responsive apparatus for tuning the transceiver to a particular channel and setting up a transceiving algorithm implementation, both corresponding to those of the cell region site serving the station, for improving perceived voice quality in the presence of cochannel interference in that service region.

BRIEF DESCRIPTION OF THE DRAWING

A more complete understanding of the invention and its various features, objects, and advantages may be obtained from a consideration of the appended claims and the following detailed description in connection with the attached drawings in which

DETAILED DESCRIPTION

Figure 1:
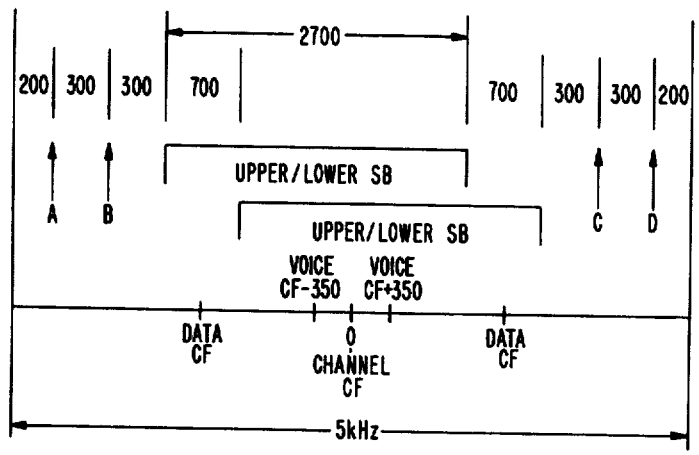
FIG. 1 is a frequency spectrum diagram of a communication channel for illustrating an aspect of the present invention.

In AM SSB systems, it is useful to be able to use cell arrays of the type previously designed for FM operations. This is achieved by utilization of the present invention which employs a combination of channel set reuse and transceiving algorithm implementation reuse to realize overall system operation with a reusable cell pattern of channel sets that is satisfactory for FM operation but which, without the present invention, produces unsatisfactory cochannel interference in AM SSB operation. Stated differently, the invention enables operation with a much smaller channel reuse distance than previously would have been possible with an SSB cellular system.

"Cochannel interference" is here used in reference to signals from a first station (the interferer) received on a given nominal channel at a second station which is actually working a third station on the same nominal channel and without reference to whether or not any two or more of the stations are operating on the same transceiver algorithm implementation.

The term "transceiving algorithm" is herein used to mean an aspect of transceiver operation which governs cooperation of a communicating set of a transmitter and a receiver in regard to voice signal processing (vis a vis transceiver control in a supervisory sense, as is the case for use in the SAT). For purposes of the present invention, such an algorithm which permits variable implementations is of particular interest. It has been found that by using different sets of implementations of a transceiving algorithm, the perceived quality of received voice signals in the presence of cochannel interference using a different implementation is improved as compared to perceived quality of signals received in the presence of cochannel interference which had been transmitted according to the same transceiving algorithm implementation. Some illustrative implementation examples include different implementations of such transceiver signal processing algorithms as employing different amounts of mistuning, different types of scrambling, and different pilot tone positions. The term "scrambling" is used here to include various codes for processing voice signals to reduce the intelligibility of interference when unlike codes are used to send an interfering signal and receive a desired signal. Good intelligibility is maintained when like codes are used. Some examples of codes include sideband selection, changing time relationships, changing normal harmonic relationships, e.g., by frequency offsetting, and the like. The present invention is described in terms of an SSB system including such variables as pilot signal position, voice frequency band offset, and sideband selection.

Further in connection with the foregoing description of the term "transceiving algorithm," it is useful to characterize the term "voice quality." This is not a characteristic which can be conveniently expressed in terms of numerals. It has reference to the relative annoyance experienced by a user in the sense that, e.g., a high quality voice signal results in low user annoyance. Quality might be said to involve the combined effects of noise, distortion, and the undesirable residual intelligibility of the interference contained in a voice signal.

For purposes of describing the present invention in a single sideband system, the algorithm implementations include a set of different positions in a channel bandwidth for a pilot frequency transmitted along with the SSB voice signal. That pilot signal is selected out at a receiving station for use there in accomplishing phase and gain correction of the voice band signal. Also included in different embodiments is a set of different combinations of voice band sideband presentations and positions in the channel bandwidth.

FIG. 1 is a spectrum diagram for channel frequency variables for a 5-KHz channel and without reference to the location of that channel in the total spectrum of frequencies. The diagram illustrates one set of pilot positions and one set of voice band combinations to be used in describing illustrative embodiments of the present invention. Cellular radiotelephone systems generally contemplate duplex operation on a dual-frequency voice channel including a different carrier frequency for each direction of voice communication. FIG. 1 depicts spectrum arrangements for what is herein called a channel and which is useful separately for each direction of communication on a dual-frequency channel. Thus, in the system to be described, any given channel includes a pilot tone at only one of the four illustrated pilot frequency positions A, B, C, and D. These pilot frequency positions are advantageously located near the edges of the channel, leaving the central portion of the channel spectrum for voice band transmissions. With this arrangement, it is not necessary when extracting a pilot signal from received signals to leave a frequency spectrum hole in some part of the voice band, as has been suggested in the prior art. Pilot frequencies closest to the channel edge are advantageously spaced about 200 Hz from that edge and are spaced 300 Hz from the closest ones of other pilot frequency positions, which are at least 300 Hz from a voice band portion of the spectrum. This sort of pilot frequency spacing takes into account the fact that Doppler frequency spread in mobile radio multipath systems for land-based vehicles operating in the 800- to 900-MHz range extends about plus or minus 80 Hz with respect to the nominal frequency of any signal.

Although the illustration in FIG. 1 indicates four pilot positions, other higher or lower numbers of positions can also be employed but should correspond to one of the known geometrically realizable values of the number N of cells in a cell cluster forming a channel reuse pattern. (The numbers of cells per cluster, and other aspects are considered in greater detail in "The Cellular Concept" by V. H. MacDonald, at pages 15–41 of the BSTJ issue.) However, the higher the number of pilot positions, the more frequency spectrum which must be allocated for nonvoice transmission purposes; and the lower the number of pilot positions, the more difficult it is to achieve coverage of a reasonable service area with adequate cochannel interference protection. It is presently believed that three is the smallest useful number of pilot positions for an embodiment of the present invention utilizing more than a single pilot frequency position.

Still in regard to FIG. 1, the central portion of the channel spectrum comprises a 3400-Hz range wherein the voice band of 2700 Hz is located in one or more predetermined frequency offset positions. The two illustrative positions in FIG. 1 are offset by 700 Hz from one another. One position, hereinafter designated the low offset position, is 800 Hz above the lower channel edge (left edge as illustrated in FIG. 1) frequency, while the other, hereinafter designated the high offset position, is 1500 Hz above the same channel edge frequency. In addition, each voice band may represent signals of either the upper (noninverted) sideband or the lower (inverted) sideband of the modulated voice signal transmitted for illustrative embodiments to be described herein. Those embodiments advantageously employ four voice band variables. Such variables will be identified as information band codes a, b, c, and d, identified as follows:

a = noninverted sideband/low offset
b = noninverted sideband/high offset
c = inverted sideband/low offset
d = inverted sideband/high offset For purposes of illustration, three embodiments will be described using different combinations of transceiving algorithm implementations for enhancing received voice quality in the presence of cochannel interference using a different implementation as compared to received voice quality in the presence of cochannel interference using the same algorithm implementation. A first embodiment uses the four indicated pilot positions and a single information band code. The second embodiment uses the four indicated information band codes and a single pilot frequency position. The third embodiment is a combination of the other two and utilizes both the set of four codes and the set of four pilot positions. Before considering the different embodiments in greater detail, it is useful to review one set of typical circuit arrangements that are useful for operating with variable algorithm implementations.

Figure 2:
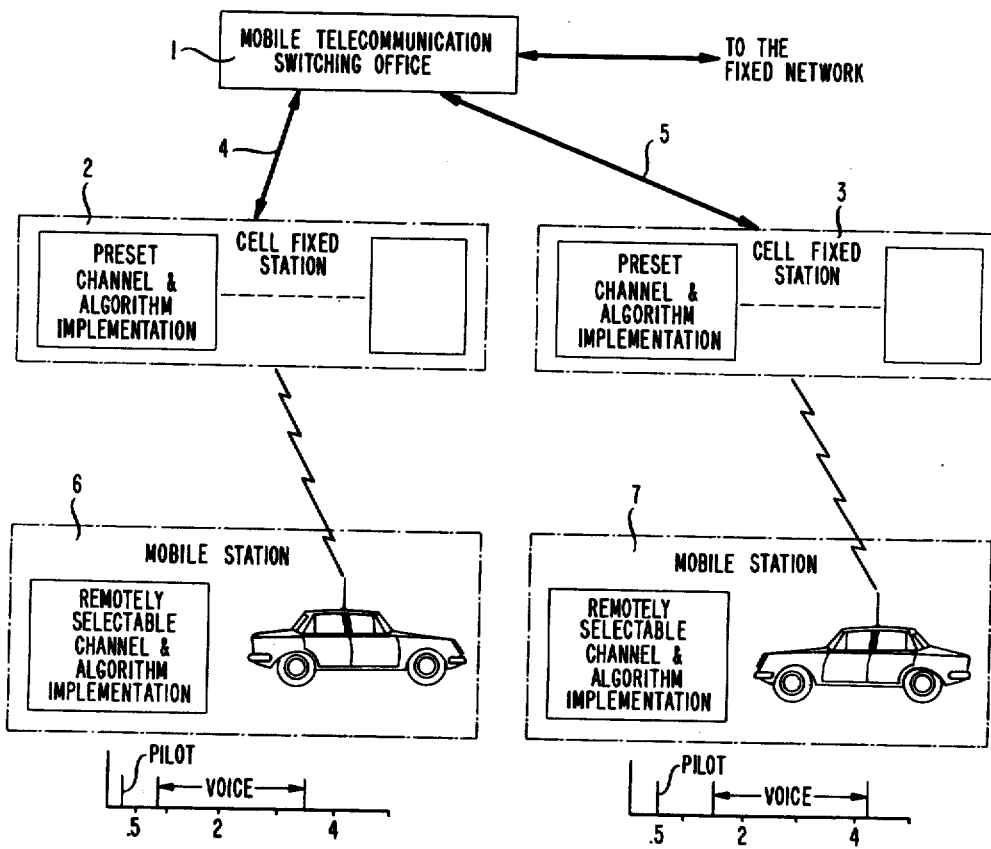
FIG. 2 is a simplified block and line diagram of a part of a cellular, channel reuse, mobile, radiotelephone system utilizing the present invention.

FIG. 2 is a simplified diagram of a cellular channel reuse mobile radiotelephone system such as that shown in the aforementioned issue of the *Bell System Technical Journal*, except that FIG. 2 relates to an AM SSB embodiment rather than an FM embodiment. Furthermore, the pilot frequency actually employed for a particular channel is advantageously utilized as well for supervisory audio tone (SAT) control functions indicated in the BSTJ. FIG. 2 and related circuit arrangements will be described in terms of omnidirectionally center-excited cells, although it is equally applicable to other forms of cellular systems, e.g., those employing directionally corner-excited cells. Hence, the invention is considered in terms of a service region served by a channel set operating through antennas and associated equipment of a cell antenna site, regardless of whether that region nominally embraces either all or some specific part of one of the cells which define a reusable geometrical pattern of cells which are to be served by the channel sets of a fixed block of dual-frequency duplex channels.

Figure 5:
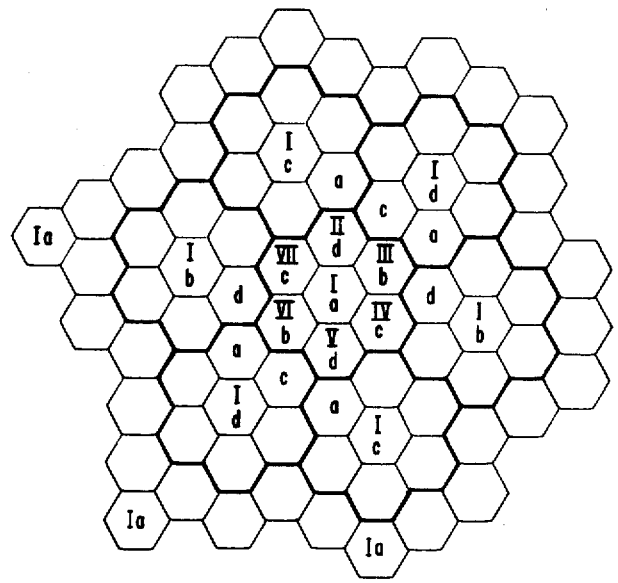

In the mentioned BSTJ issue on page 11, FIG. 1 illustrates one basic cellular arrangement including seven adjacent cells, each served by a cell antenna site providing radio links with mobile units in the cells. Each site is in fixed-line communication with a mobile telecommunication switching office (MTSO) that, in turn, interfaces the system to the fixed station telephone network. FIG. 5 one page 49 of the BSTJ, illustrates the reuse of that basic cellular pattern and its channel sets to extend the radiotelephone coverage to an area larger than the area of the pattern. Similarly, FIG. 2 herein includes an MTSO 1 which is coupled to the fixed telephone network (not specifically shown) and to a plurality of fixed cell antenna site stations such as the stations 2 and 3. Single lines 4 and 5, connecting the MTSO 1 with the respective stations 2 and 3, schematically represent separate signal paths, or trunks, for each channel equipped at one of the stations, as well as representing additional data transmission links between the MTSO and the respective stations for communicating system control information. In this regard, the MTSO is essentially the same as that described in the paper, "Advanced Mobile Phone Service: Mobile Telephone Switching Office," by K. J. S. Chadha et al. at pages 71-95 of the mentioned BSTJ, except that channel identification data stored in, and used by, the MTSO 1 includes for each channel of the set assigned to a particular station a designation of the transceiver algorithm implementation for the channel. In the illustrative embodiment, that data includes pilot frequency position in the channel for both directions of transmission and the voice band information code for the dual-frequency channel.

Similarly, the cell site fixed stations 2 and 3 are essentially the same as that described in the paper, "Advanced Mobile Phone Service: Cell-site Hardware," by N. Ehrlich et al. at pages 153-199 of the mentioned issue of the BSTJ, with certain exceptions. The pilot tone is utilized for the SAT functions, the respective channel transceivers are SSB transceivers adapted for setting particular signal processing arrangements therein according to the aforementioned transceiver algorithm implementations, and data transmission by radio link between a cell site and mobile units served by that site is modified as will be described to take advantage of certain SSB operating techniques.

In like fashion, mobile units served by the system, and represented by the two mobile stations 6 and 7 in FIG. 2, are also similar to the stations described in a paper, "Advanced Mobile Phone Service: A Subscriber Set for the Equipment Test," by R. E. Fisher at pages 123-143 of the mentioned BSTJ issue. Thus, the mobile station transceivers utilize similar interface arrangements for diversity switching functions, for a transceiver logic unit, and for a station user's control unit, i.e., station set. Otherwise, the stations employ different transceivers adapted for SSB operation and wherein the transceiver logic unit is responsive to MTSO data messages received by way of a cell fixed station for fixing the mobile station channel of operation and, in the case of voice channels, a particular pilot position and information band code.

In the FM cellular system of the BSTJ issue, data transmission between fixed cell stations and mobile stations served thereby is accomplished in either of two ways. A set-up channel is used for data communications involved in establishing cell connections. A blank-and-burst data transmission mode is used on a voice channel to accomplish the handing off of a mobile unit from one voice channel to another when it becomes necessary to cause the unit to be served by a different cell fixed station as the mobile unit moves among the service regions of the mobile service area. In the blank-and-burst mode, voice transmission is momentarily interrupted for the transmission of a burst of wide band data. In accordance with the illustrative embodiments considered here, the set-up channel functions are accomplished on a wide band data channel which typically includes a bandwidth corresponding to that of approximately seven AM SSB voice channels, i.e., about 35 KHz, since the wide band data is advantageously transmitted in a frequency-shift-keyed (FSK) mode as was the case for the set-up channels in the prior FM cellular systems. However, for non-set-up functions, the illustrative SSB system employs a different technique than is found in the mentioned FM system. Since the illustrative AM SSB system voice channels each includes a total bandwidth greater than the actual voice bandwidth, it is advantageous to include a data transmission band in each channel so that the necessary data for hand-off operations can be transmitted in a narrow band low-speed mode which is compatible with the relatively narrow bandwidth of the AM SSB channels. To this end, the 700-Hz voice offset space in the channel spectrum above, in frequency, the low offset voice band for some channels, and below the high offset voice band for other channels, is utilized for that low-speed data transmission. Tracking filters are utilized in the mobile stations and tuned according to received data signals to monitor the proper 700-Hz data band, i.e., the adjacent one outside of the voice band of interest, for a particular channel to which the mobile station is tuned.

In FIG. 2, the two illustrated fixed cell stations 2 and 3 are to be considered as a pair of closest cochannel sites in adjacent reuse patterns of cells, cochannel here meaning that they utilize the same nominal channels of the same channel set. However, since these stations are assumed to be in adjacent channel reuse clusters of cells, their transceivers are advantageously arranged to operate on different transceiver algorithm implementations, as described in connection with FIG. 1, with preset voice band code and pilot frequency position employed uniformly for all channels operated at the cell station with respect to a particular service region. These different implementations are in FIG. 2 illustrated in the spectrum diagrams below the mobile stations 6 and 7 served by the respective stations 2 and 3. The implementations correspond to the aforementioned third embodiment of the invention which, subsequently, will be described in greater detail. In that embodiment, the implementation for the service region of cell station 2 includes a pilot frequency position A at 200 Hz above the low edge frequency of the channel and information code a (voice band low edge frequency at 800 Hz above the low edge frequency of the channel), assuming use of the noninverted sideband. Similarly, the implementation for the service region of cell station 3 includes pilot frequency position B at 500 Hz above the low edge frequency of the channel and information code b (voice band low edge frequency at 1500 Hz above the low edge frequency of the channel), again assuming use of the noninverted sideband. Here again, the implementations of the transceiver algorithm are applied to all channel sets serving the respective service regions of the fixed stations 2 and 3.

Voice band signals are selected are processed utilizing the assigned pilot frequency which is selected from received signals at a station. If, for example, significant cochannel interference from fixed cell station 3 is received at mobile station 6, the 3500-Hz through 4200-Hz (above the channel edge) parts of the interfering voice band signal are rejected by filtering in the mobile station 6, thereby reducing the interfering signal power and similarly, at least in part, reducing the perceived voice quality of the interference signal in mobile station 6 as compared to the perceived voice quality of the correct voice band signal transmitted from station 2 to the mobile station 6 where it is received without similar truncation of its bandwidth. The interfering signal may or may not be intelligible, but the quality of that interfering signal will be significantly lower than that of the correct signal, even during most fades in the latter signal. Similarly, the B position pilot of the interfering signal will be rejected in mobile station 6, which is looking only for the A position pilot. Thus, the interfering B pilot cannot introduce significant amplitude and phase distortion effects in the A pilot recovered in mobile unit 6, which pilot distortion would otherwise correspondingly distort the recovered voice band signal in that unit.

Furthermore, the b code voice band signal from interfering station 3 is further distorted in mobile station 6 because it is there processed by a recovered A position pilot having amplitude and phase information which is not coherent with those aspects of the b code voice band of the interfering signal. The mentioned further distortion effects further improve the perceived voice quality in station 6 of the signal received from fixed station 2 because the intelligibility of the interfering signal from fixed station 3 is further reduced and will be less annoying to the station 6 user.

Figure 3:
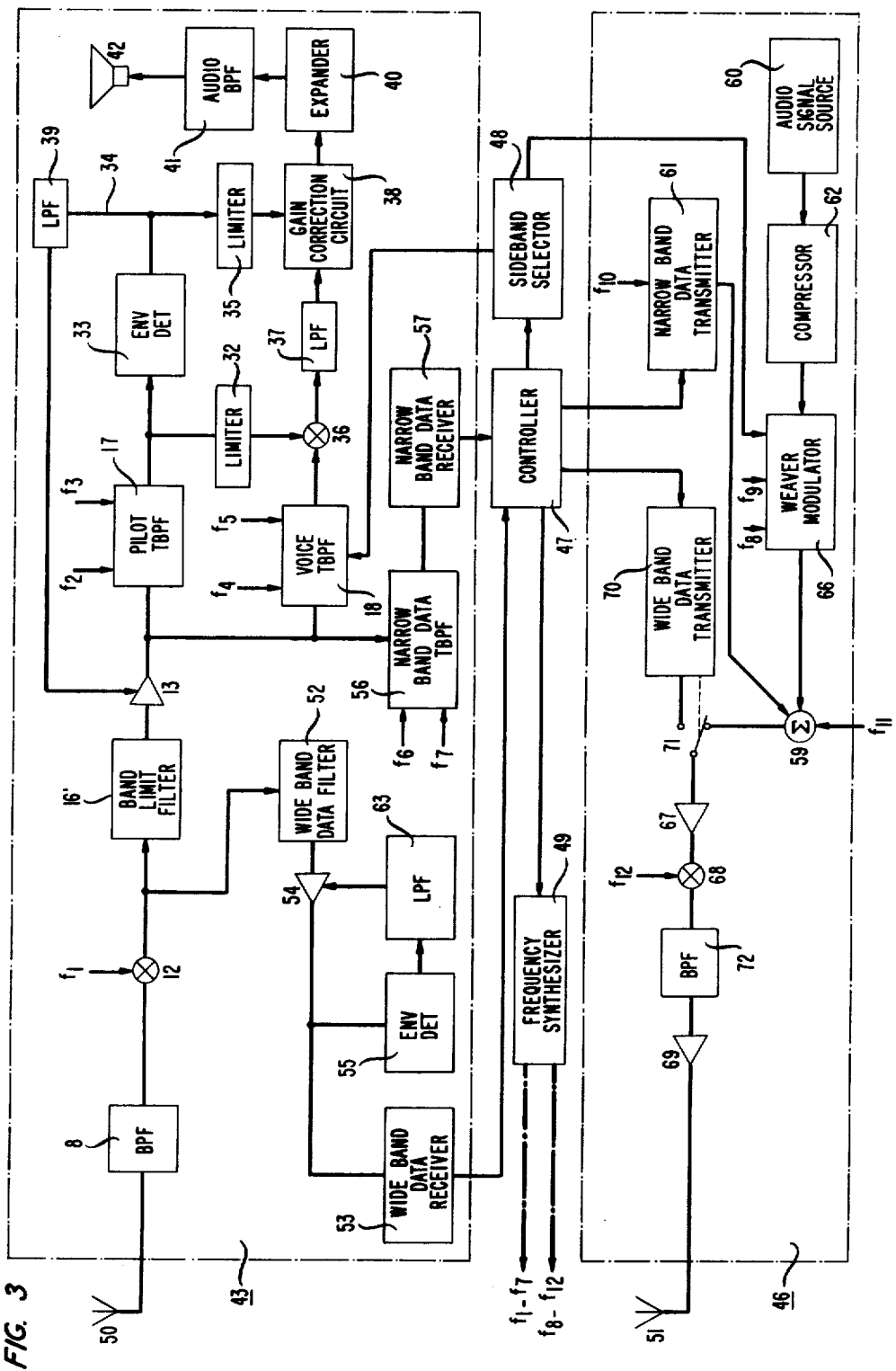
FIG. 3 is a block and line diagram of a mobile unit transceiver that is useful in the system of FIG. 2.

FIG. 3 is a simplified diagram of a single sideband transceiver which is useful in either cell fixed stations or in mobile stations. It is here shown and described, however, as applied to a mobile station, since the main difference between mobile and fixed transceivers is that, in the fixed station transceivers, frequency selections for determining voice band and data band positions, as well as the selected sideband and the pilot frequency position, are all advantageously permanently fixed for each channel at each cell fixed station transceiver. Thus, the transceiver at such station would lack the corresponding electric circuit connections shown in FIG. 3. In addition, a transceiver controller at a fixed station is provided with fixed wire line data communication input and output facilities (not shown in FIG. 3) for data communication with the MTSO for control of the cell fixed station and of mobile stations communicating therewith.

In FIG. 3, the transceiver includes a receiver 43 and a transmitter 46 which share a transceiver controller (or logic circuit) 47, a sideband selector 48, and a frequency synthesizer 49. The selector 48 and synthesizer 49 are operated by the controller 47 in response to its transceiver operation program and data signals received, for example, by way of the receiver 43. Sideband selector 48 is simply a circuit which is responsive to a binary level signal from the controller 47 for providing, e.g., a relay control signal to each of the receiver 43 and transmitter 46 for effecting sideband selection in a manner to be described. Controller 47 is advantageously a microprocessor-based controller of any suitable type now well known in the art for controlling radio transceivers in mobile radio systems. One such controller is illustrated in FIG. 9 of the aforementioned Fisher paper. Frequency synthesizer 49 is also of a type well known in the art and, as illustrated in FIG. 3, advantageously includes schematically a frequency stabilization circuit such as that disclosed in the copending application Ser. No. 06/097,422, filed Nov. 26, 1979, for K. W. Leland et al., entitled "Frequency Stabilization Circuit for a Local Oscillator," and assigned to the same assignee as the present application.

Separate antennas 50 and 51 are shown in FIG. 3 for convenience of illustration. However, in practice, a switched diversity reception system would advantageously be employed wherein the receiver may at times share the same antenna with the transmitter.

Receiver 43 is advantageously of the type shown in the aforementioned copending application of K. W. Leland, U.S. Pat. No. 4,313,211. The operation of this receiver is briefly summarized here for the benefit of the reader and utilizing reference characters which are the same as or similar to those utilized in the mentioned Leland application.

Input signals from antenna 50 are applied through a band limiting filter 8 with a passband of about 20 MHz. Output of that filter is applied to an input of a first mixer 12 that is controlled by a frequency $f_1$ from the synthesizer 49. The mixer 12 down-converters received signals to an intermediate frequency (IF) range having a center frequency (CF) which is the same as that of the desired channel, and which is also the CF of a band limiting filter 16' to be further described. The mixer output is also coupled to a wideband data filter 52 which differently limits the band of the received signals to about seven voice channels, i.e., 35 KHz. Output of filter 52 is coupled through a gain control amplifier 54 to an input of a wideband data receiver 53, e.g., of the type illustrated on page 142 in the aforementioned BSTJ issue. Filter 52 advantageously has the CF of its pass band at the channel CF of the central one of the seven adjacent 5-KHz spectrum segments comprising the set-up channel. Signals from the output of amplifier 54 are also coupled through an envelope detector 55 and a low pass filter 63 to provide the automatic gain control signal to amplifier 54. The receiver 53 brings the signals from mixer 12 down to a base band format, and recovers the data therefrom for application to the controller 47 to specify, among other things, the channel to be used by the transceiver and the necessary information for defining the transceiving algorithm implementation as hereinbefore discussed. Controller 47 provides corresponding control signals to the sideband selector 48 and the frequency synthesizer 49, which thereby determine the transceiving algorithm implementation by providing control frequencies and sideband selection signals, as illustrated, to the receiver 43 and the transmitter 46.

The control frequencies and selection signals are utilized primarily for controlling and configuring so-called translating bandpass filters (TBPF). Such filters comprise a Weaver-type modulator/demodulator, described in some detail in the aforementioned Leland receiver application, and including parallel in-phase and quadrature-phase paths. For demodulation, a first mixing stage brings a predetermined frequency in a received band of signals down to base band level at which it is selected by a low-pass filter stage. The outputs of that stage are coupled through a second mixing stage which brings the information up to a desired frequency band. Outputs of the two paths are then combined. A Weaver circuit of the modulation type is similarly configured, except that the input control frequency for the first mixing stage is lower than that for the second mixer stage.

Filter 16' has a bandwidth of about three channels at 60-db-down points, i.e., about 15 KHz, in order to improve the channel rejection properties of the following receiver circuits with respect to channels more than one channel away from the desired channel. It is well known in the art that the effects of adjacent channels are usually reduced by not assigning adjacent channels at the same cell site, a precaution that can be implemented without reducing spectral efficiency. A gain control amplifier 13 couples output of filter 16' to several circuits of receiver 43.

One output of amplifier 13 is applied to an input of a narrow band data TBPF 56 for responding to narrow band data signals included with voice signals as described in connection with FIG. 1. Filter 56 responds to frequency synthesizer output control frequencies $f_6$ and $f_7$ for reducing the IF signal bandwidth to the base band position at which the specific one of the data bands for the directed channel is within the pass band of the low pass filter stage of the TBPF 56. A narrow band data receiver 57 of any type well known in the art recovers from the output of TBPF 56, the data signal clock frequency, and bit and word synchronization information for regenerating the data. That data is applied to the controller 47 for channel specification and for control of the mobile unit station set functions.

The output of amplifier 13 is also coupled to an input of a pilot frequency TBPF 17, which is responsive to control frequencies $f_2$ and $f_3$ for selecting the pilot frequency of the desired channel and applying it at the IF level through a limiter 32 to an input of a mixer 36. The same output of a filter 16' is also coupled through a voice TBPF 18 which is responsive to control frequencies $f_4$ and $f_5$ to select the desired voice band position of the selected 5-KHz channel and apply it at IF to a second input of the mixer 36. In that mixer, the voice signals are down-converted to the base band level; and, in the process, they are phase-corrected as described in the Leland receiver application. The desired sideband for the selected channel is obtained in response to the signal from selector 48 which advantageously interchanges the two quadrature-related signal path inputs to the second mixing stage of the TBPF 18 for thereby placing the desired sideband into the pass band of a low pass filter 37 which receives the phase-corrected output from mixer 36.

Output signals from pilot TBPF 17 are further coupled through envelope detector 33 for use in accomplishing gain correction in the receiver. A lead 34 applies the detector output through a low pass filter 39 to provide automatic gain control at the amplifier 13 for relatively slow amplitude variations. The detector output is also coupled through a limiter 35 to a gain correction circuit 38 for adjusting the level of output signals from low pass filter 37 to compensate for fast fading, such as appears in the mobile radio, multipath, Rayleigh fading environment as described in the Leland application. Gain corrected output is then applied through an expander 40 (assuming the received signal had been compressed) and an audio bandpass filter 41 to a loudspeaker 42, or telephone handset. Of course, if the transceiver is in a fixed station, the output of filter 41 is applied to a fixed trunk circuit which couples the signals back to the MTSO.

Transmitter 46 uses the the single sideband modulator of the D. K. Weaver, Jr., U.S. Pat. No. 2,928,055 with additions to render the transmitter compatible with the receiver 43 just described. Audio signals from an audio signal source 60, such as a mobile station transceiver handset or a fixed station trunk circuit from the MTSO, are applied through a signal compressor 62 to an input of a Weaver modulator 66. That modulator is controlled by control frequency signals $f_8$ and $f_9$ from the synthesizer 49, and by a signal from sideband selector 48, for bringing the audio signals up to a predetermined IF level. Signals at the IF from modulator 66 have the desired sideband for the transceiving algorithm implementation positioned so that it will be properly selected by the voice TBPF in the appropriate receiving station. Output from modulator 66 is supplied to a first input of an analog summing circuit 59.

The narrow band data signals, for a mobile station, are used to send to the cell fixed station and to the MTSO data relating to such things as dialed digits for custom calling services. These signals are provided from controller 47 to a narrow band data transmitter 61 which raises them to IF in the appropriate one of the 700-Hz data bands for the transceiving algorithm being used. For that purpose, the transmitter 61 is also responsive to a control frequency $f_{10}$ from synthesizer 49. Output from transmitter 61 is applied to another input of summing circuit 59. A pilot frequency signal $f_{11}$ appropriate to the transceiving algorithm being used is also provided by synthesizer 49 to a third input of the summing circuit 59.

Combined signals in the output of circuit 49 are coupled by a selector switch armature 71 and an amplifier 67 to an input of a mixer 68. There the signals are combined with the frequency $f_{12}$ from synthesizer 49 for bringing the signals to the radio frequency range for the channel. Filter 72 is used to reject the undesired mixing product, and the remaining radio frequency signals are then applied through an amplifier 69 to the antenna 51 for broadcast.

A wideband data transmitter 70 is utilized for set-up channel data transmission in response to output signals from controller 47. This transmitter is similar to the encoder illustrated at page 141 of the mentioned BSTJ issue. When transmitter 70 is activated by signals from controller 47, it in turn actuates the selector switch armature 71 for substituting in the input of amplifier 67 the output of transmitter 70. When the transceiver is handed off from a set-up channel to a voice channel, the armature 71 is restored to the position illustrated for enabling the transmission of voice, pilot, and narrowband data signals as previously discussed.

Figure 4:
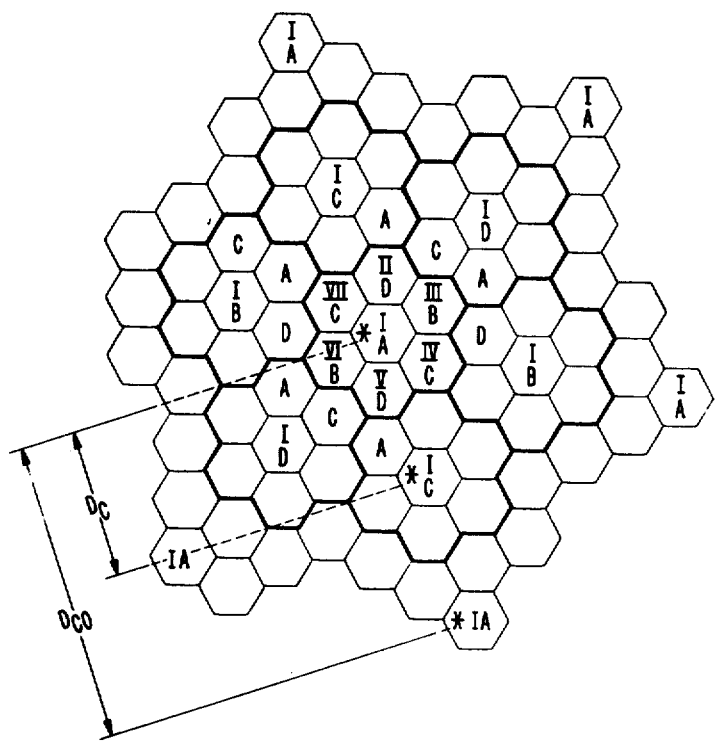
FIGS. 4 through 6 illustrate cell system channel and implementation distribution patterns which schematically represent different embodiments of the present invention.

FIG. 4 depicts an hexagonal cell grid showing a Mobile Service Area (MSA) converage plan using a seven-cell (N=7) channel reuse pattern. A "reuse pattern" is a pattern of cells, or groups of cells, that can be repeated to reuse some characteristic of a cell, such as assigned channel set and/or assigned transceiver algorithm implementation. In the illustrated seven-cell channel reuse pattern the transceiver algorithm implementation includes four pilot frequency positions and a single information code. In a centrally located cell cluster in FIG. 4, a central cell is surrounded by six additional cells. These seven cells of the central cluster are respectively designated by Roman numerals I-VII, which numerals also here designate the seven sets of dual-frequency channel of a block of channels which are used to cover an entire MSA by iteration of the same seven-cell pattern with channel set assignments in the same relative cell positions. That central seven-cell cluster is outlined by broad lines, as are six additional seven-cell clusters which are arranged in a first ring of clusters around the first mentioned central cluster. It should be appreciated, however, that any cell in the grid can be considered to be the central cell of a seven-cell cluster. Only the first channel set I is indicated in each cell cluster of the first ring to avoid unduly complicating the drawing.

In accordance with the present invention, a predetermined systematic variation of transceiver alogorithm implementation is employed in the FIG. 4 cell clusters utilizing the illustrated channel set distribution pattern. As illustrated, each group of four adjacent cells using four different algorithm implementations forms an implementation reuse pattern. The particular variation system employed must be such that, in cells of contiguous clusters, no service region in one cluster employs the same combination of channel set and algorithm implementation as is employed in a service region of at least a contiguous cluster. Thus, in FIG. 4, four adjacent seven-cell clusters form a channel-implementation reuse pattern. As a consequence, the actual distance between stations utilizing the same combination is extended far beyond that otherwise available without the implementation variations; and the interfering signal from such a more remote location is at such a low level that its presence in received signals usually causes no problem.

More specifically in regard to FIG. 4, it is assumed that a single information code is utilized throughout the grid. That code is not indicated on the drawing, but it is assumed for purposes of illustration to be the code a. Pilot frequency positions indicated by the reference characters A-D from FIG. 1 are utilized in FIG. 4 in the mentioned central cell cluster. The position A in the central cluster of FIG. 4 is utilized for all channels serving the central cell of that cluster. The positions B-D are utilized in recurring sequence in the other six cells arranged around the center cell in that central cluster. The same pilot frequency positions A-D are utilized in all clusters of the illustrated MSA, but in different relative positions within the respective clusters of the first ring of clusters. In order to achieve systematic permutation of pilot frequency positions among the respective cell positions in the clusters of a seven-cluster group, the assignment of positions is conveniently considered in accordance with a position distribution plan which is consistent with the position locations in the central cluster. Thus, for example, when all of the cells in an MSA are considered in terms of columns and rows of cells, the pilot positions A and D are utilized in alternate cells, respectively, of alternate columns. In those alternate columns, corresponding cells are considered to comprise a row of cells in which the positions A and D again are alternately used. A similar method is employed to extend the use of pilot frequency positions B and C in the intermediate column sets of cells as illustrated in FIG. 4.

The result of the foregoing arrangement in FIG. 4 is that a full cochannel reuse, i.e., in cells using both the same channel set and the same pilot frequency implementation, first occurs in a second ring of cell clusters; and five such full cochannel reuses are indicated in FIG. 4. Thus, although only seven channel sets need be available for a seven-cell cluster of a channel reuse pattern, the reuse distance between cell service regions using both the same channel set and the same pilot frequency position is much greater than that for regions using the same nominal channel set without regard to pilot position. For example, as to the central cell and cluster of FIG. 4, the closest reuse of the same nominal channel set, i.e., set I, is found in each next adjacent cell cluster; but the use there of a different pilot frequency position (B, C, or D rather than A) results in sufficient improvement at the first mentioned central cell in perceived voice quality of the desired noninterfering signals in the presence of cochannel pilot interference from adjacent clusters as to render the desired voice signal quality usually acceptable. This is due to the reduction of co-channel pilot-interference-induced voice distortion in the receiver voice envelope correction process. Stated differently, the use of different transceiver algorithm implementations has made it possible to increase greatly the effective reuse distance D, so that the effective N, or cell pattern size, has been correspondingly increased, assuming continued use of the same cell size.

Values of N used for channel sets $N_C$, in a channel reuse pattern, and for algorithm implementation sets $N_A$ in an algorithm implementation reuse pattern, can be any of the integer values that are suitable for channel reuse cell cluster size for the type of cell involved. $N_A$ and $N_C$ need not be equal. However, if they are, the set distribution patterns among the cell service regions must be slipped, as naturally results when $N_A$ is not equal to $N_C$, in order to achieve the desired larger effective N. One such technique that can be used, e.g., where $N_A = N_C = 7$, is to use a first implementation in all cells of a central cluster and use the six other implementations in sequence in the six surrounding first ring clusters, i.e., treating whole clusters for the $N_A$ case as though they were cells. This is equivalent to using a different effective "cell" radius, in the classical hexagonal relationship $D/R = \sqrt{3N}$, when $N_A = N_C$.

The concept of using a single implementation in a central cell cluster and different implementations in surrounding clusters is also useful for cases in which $N_A$ does not equal $N_C$. Thus, it is apparent that numerous options are available for applying a given set of transceiver algorithm implementations to the cell grid.

It is apparent from FIGS. 1 and 4 that although the system employs a seven-cell channel-reuse cluster with all of the service area channels divided into seven channel sets with a corresponding nominal channel reuse distance $D_C$, the effective reuse distance $D_{CO}$ for the combination of a given channel set and algorithm implementation is much larger. The distance $D_C$ and $D_{CO}$ are marked in FIG. 4 with respect to three cells indicated by asterisks, all using channel set I, and all lying in corresponding positions in sequentially adjacent cell clusters. The price that is paid for larger effective reuse distance in FIG. 4 is that the individual channels have a larger bandwidth, to accommodate selectable pilot positions, than would otherwise be required for an SSB channel with out-of-band pilot. However, that is a small price to pay compared to the extra channel sets required for an AM SSB cellular system using the same sized channel sets per service region and requiring more cells per channel reuse pattern to get cochannel stations adequately far apart so that the effects of distance alone (without selectable implementations) will permit a comparable level of voice quality in the presence of cochannel interference.

FIG. 5 illustrates a further embodiment of the invention in which the transceiving algorithm implementations include the four information codes a-d, and all use a single pilot frequency position. In this case, the single position is assumed to be, e.g., the position A, and it is not specifically indicated in FIG. 5. However, the four information codes are distributed among the cells of the central cell cluster and the various other clusters of the MSA in the same manner hereinbefore described in connection with FIG. 4 for the distribution of pilot frequency positions. Here the purpose is to reduce the likelihood of receiving intelligible interference since such interference is considered to be a very negative subjective effect in a telephone service. Hence, the same descriptive material regarding those positions of FIG. 4 also applies for the information code distributions in FIG. 5.

Figure 6:
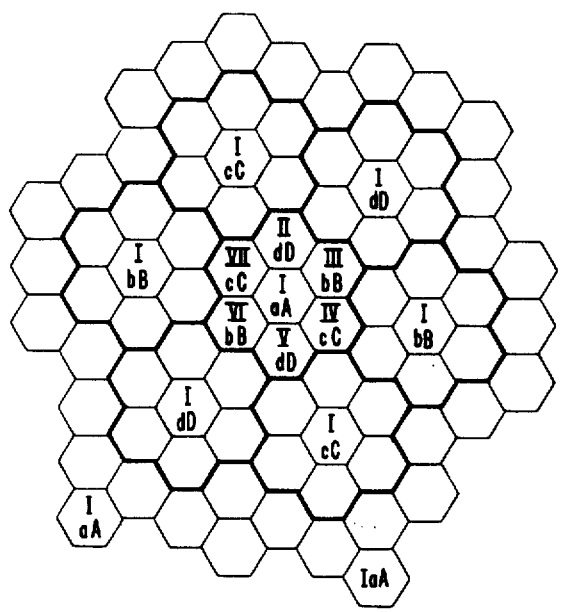

FIG. 6 illustrates a third embodiment of the invention in which the transceiver algorithm implementations include that four information codes a-d, and the four pilot frequency positions A-D applied in like-lettered pairs distributed among the cells in the same fashion already described in connection with the pilot positions of FIG. 4. However, in the embodiment of FIG. 6, perceived voice quality in received signals is further improved, as compared to that of the embodiments in either FIG. 3 or FIG. 4, because of the combined effects of the two sets of algorithm implementations.

Although the present invention has been described in connection with particular embodiments thereof, it is to be understood that additional embodiments, applications, and modifications which would be obvious to those skilled in the art, are included within the spirit and scope of the invention.

The like-lettered code-position pairing illustrated is, of course, only one of the possible pairing arrangements. However, the like-lettered arrangement has the further advantage that it minimizes the differences among pairs as to the frequency spacing between pilot position and closest edge of the offset voice band of the same implementation. Thus, it can be seen from FIG. 1 for the codes previously defined that the aA and dD implementations have 600 Hz spacings, while the bB and cC implementations have 1000 Hz spacings. It is advantageous to minimize the differences so that frequency delay spread effects, as between a pilot and its associated voice band, will be similar for all implementations, and, thus, have similar impacts on voice signal quality.

I claim:

1. In a cellular, channel reuse, mobile radiotelephone system including plural stations in a mobile service area, each station being equipped with at least one radio transceiver (FIG. 3) for operation on a frequency channel, the system being characterized in that each transceiver includes means (17, 18, 66) for effecting transceiver operation with respect to said channel according to a selectable implementation of a predetermined transceiver algorithm, and means (48, 49) for systematically setting said effecting means to use one of a predetermined plurality of different implementations of said algorithm according to the location of the transceiver, in relation to a predetermined systematic pattern of distribution of use of said implementations, in the mobile service area.

2. The system in accordance with claim 1 in which a plurality of said stations were fixed stations distributed at predetermined locations in said area for providing radiotelephone service to different regions of said area, and each of said fixed stations includes at least one of said transceivers for each service region served thereby, each transceiver being normally tuned to a predetermined different channel according to the service region being served, and the setting means for said each transceiver normally setting the effecting means thereof to an implementation according to the service region served.

3. The system in accordance with claim 1 or claim 2 in which at least one of said stations is a mobile station (6) that is movable among the service regions of said area, and each of said mobile stations includes means (53, 57) for deriving from received signals control data messages for directing said setting means both to tune said transceiver to a predetermined one of said channels according to the one of said service regions serving such mobile station and to operate said effecting means of such station transceiver to an implementation according to the one of said service regions serving such mobile station.

4. The system in accordance with claim 1 further characterized in that said station transceivers are amplitude modulation single sideband transceivers.

5. In a cellular, channel reuse, mobile radiotelephone system having a plurality of stations distributed among plural service regions of a mobile service area, each station including at least one radio transceiver and a portion of said stations being mobile stations, a system operating method which is characterized by the steps of assigning predetermined different implementations of a predetermined transceiving algorithm to be used in respective service regions of the system according to an $N_A$-cell implementation reuse pattern, assigning predetermined different channel sets to be used in respective service regions of the system according to an $N_C$-cell channel reuse pattern characterized by a channel reuse distance $D_C$ between service regions of like channel assignments in adjacent uses of said channel reuse pattern and further characterized by a resulting combination reuse distance $D_{CO}$ between service regions utilizing the same combination of channel set and algorithm implementation, said combination reuse distance $D_{CO}$ being greater than said channel reuse distance $D_C$ for said $N_C$-cell pattern, and directing a mobile station in said system to operate using a combination of a channel and an implementation which are the same as those used in a service region of said system which is to serve such mobile station.

6. The method in accordance with claim 5 characterized in that the implementation assigning step comprises assigning different ones of $N_A$ different pilot frequency positions as said different implementations, respectively.

7. The method in accordance with claim 5 characterized in that the implementation assigning step comprises assigning different ones of $N_A$ different scrambling codes as said implementations, respectively.

8. The method in accordance with claim 5 characterized in that the implementation assigning step comprises assigning different ones of $N_A$ different information codes as said different implementations, respectively, each such code including a predetermined different combination of voice band frequency offset within a channel and voice band transmission sideband in the same channel.

9. The method in accordance with claim 5 characterized in that the implementation assigning step comprises assigning different ones of $N_A$ different pilot frequency positions as one part of each of said different implementations, respectively, and assigning different ones of $N_A$ different scrambling codes as another part of each of said different implementations, respectively.

10. The method in accordance with claim 5 characterized in that the implementation assigning step comprises assigning different ones of $N_A$ different pilot frequency positions as one part of each of said different implementations, respectively, and assigning different ones of $N_A$ different information codes as another part of each of said different implementations, respectively, each such code including a predetermined different combination of voice band frequency offset within a channel and voice band transmission sideband in the same channel.

11. In a cellular, channel reuse, mobile radiotelephone system for a predetermined mobile service area and having plural fixed stations (2, 3), each including a plurality of transceivers tunable to different dual-frequency channels, the stations of each service region of a channel reuse cell cluster utilizing different predetermined channel sets (I–VII), plural contiguous clusters being employed, the system further including plural mobile stations (6, 7), each including a transceiver that is tunable to a dual-frequency radio channel, such channel being a channel of a service region which is to serve such mobile station in said system, the system being characterized in that said transceivers of said fixed and mobile stations of a service region each includes means (17, 49) for operating such transceiver in accordance with a transceiver algorithm implementation (A) of a predetermined set of implementations, said algorithm implementation in combination with a channel set (I) utilized in the last-mentioned service region being a channel-implementation combination that is different from channel-implementation combinations of service regions similarly located in contiguous ones of said clusters.

12. In a cellular, channel reuse, mobile radiotelephone system for a predetermined mobile service area and including plural fixed stations (2, 3), each having plural transceivers tunable to different dual-frequency channels, the stations of each service region of a channel reuse cell cluster utilizing different predetermined channel sets (I–VII), the cell clusters being characterized by a channel reuse distance $D_C$, the system further including plural mobile stations (6, 7), each including a transceiver that is tunable to a dual-frequency channel of a service region which is to serve such mobile station, the system being characterized in that said transceivers of said fixed and mobile stations of a service region each includes means (17, 49) for operating such transceiver in accordance with a transceiver algorithm implementation (A) of a predetermined set of implementations, different ones of such implementations being assigned for use in implementation reuse cell clusters according to an implementation reuse pattern characterized by a combination reuse distance $D_{CO}$ between regions using the same combination of channel set and implementation that is a distance greater than $D_C$, and said mobile station operating means including means for adjusting such operating means of a mobile station to use different ones of the implementations of said set to conform to the implementation of a service region in which the mobile station is located.

13. In a cellular, channel reuse, mobile radiotelephone system for a predetermined mobile service area and including plural fixed stations (2, 3), each having plural transceivers tunable to different dual-frequency channels, the stations of each service region of a channel reuse cell cluster utilizing different predetermined channel sets (I–VII), each of said cell clusters including $N_C$ cells, the system further including plural mobile stations (6, 7), each including a transceiver that is tunable to a dual-frequency channel of a service region which is to serve such mobile station, the system being characterized in that said transceivers of said fixed and mobile stations of a service region each includes means (17, 49) for operating such transceiver in accordance with a transceiver algorithm implementation (A), different ones of a plurality $N_A$ of such implementations being utilized in an implementation reuse pattern to form a reusable channel-implementation pattern such that each such channel-implementation pattern includes a number of cells equal to the product of $N_A$ and $N_C$.

14. The system in accordance with claim 13 further characterized in that a plurality of different implementations are utilized in each of said channel reuse cell clusters.

15. The system in accordance with claim 13 further characterized in that $N_A = N_C$.

16. The system in accordance with claim 13 further characterized in that a common implementation is utilized in all service regions of a cell cluster, and a plurality of different implementations are utilized in the each of said implementation reuse patterns.

17. The system in accordance with claim 13 further characterized in that said transceiver operating means includes means (18, 17) for processing received signals with respect to at least two different (a, A) characteristics of a channel signal.

18. The system in accordance with any of claims 11, 12, or 13 further characterized in that each implementation includes for each direction of transmission of a channel a voice frequency band in a predetermined spectrum position and a pilot frequency in a predetermined position.

19. The system in accordance with claim 18 further characterized in that each of said implementations comprises the placement of said pilot frequency predetermined position in a different position for each of said different implementations.

20. The system in accordance with claim 19 further characterized in that said pilot frequency positions in a first part of said implementations are above said voice frequency band in the spectrum of such channel, and said pilot frequency positions in a second part of said implementations are below said voice band in the spectrum of such channel.

21. The system in accordance with claim 18 further characterized in that in at least some of said implementations, the voice band of the channel is in a different frequency offset position with respect to the voice band in channels utilizing at least one other one of said implementations.

22. The system in accordance with claim 21 further characterized in that in at least some of said implementations, the voice band is in an inverted frequency sequential spectrum order with respect to the voice band frequency sequential spectrum order in at least one other one of said implementations.

23. The system in accordance with claim 22 further characterized in that the pilot frequency positions are different for at least some of said implementations, and a first part of said pilot frequency positions are above said voice band in frequency, and a second part of said pilot frequency positions are below said voice band in frequency.

24. The system in accordance with claim 23 further characterized in that the frequency spacing between a pilot position utilized for each implementation and the closest edge of the offset voice band of the same implementation is selected to minimize the differences among such spacings for all of said implementations.

* * * * *